United States Patent
Himmelmann

(10) Patent No.: US 8,089,189 B2
(45) Date of Patent: Jan. 3, 2012

(54) ROTOR FOR PERMANENT MAGNET ELECTRIC MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 177 days.

(21) Appl. No.: 12/489,888

(22) Filed: Jun. 23, 2009

(65) Prior Publication Data

US 2010/0320859 A1    Dec. 23, 2010

(51) Int. Cl.
*H02K 21/12* (2006.01)

(52) U.S. Cl. .............................. 310/156.22; 310/156.26

(58) Field of Classification Search ....... 310/156.12–14, 310/156.22–156.31
See application file for complete search history.

(56) References Cited

U.S. PATENT DOCUMENTS

| | | | |
|---|---|---|---|
| 4,219,752 A * | 8/1980 | Katou .................... | 310/156.19 |
| 4,814,651 A * | 3/1989 | Elris et al. ............... | 310/88 |
| 4,910,861 A * | 3/1990 | Dohogne .................. | 29/598 |
| 5,111,094 A | 5/1992 | Patel et al. | |
| 5,675,204 A | 10/1997 | Kusumoto et al. | |
| 5,998,902 A * | 12/1999 | Sleder et al. ............ | 310/153 |
| 6,075,301 A | 6/2000 | Shinoda | |
| 6,548,925 B2 * | 4/2003 | Noble et al. ............ | 310/74 |
| 6,977,453 B2 * | 12/2005 | Yoda et al. ............. | 310/156.46 |
| 7,012,349 B1 * | 3/2006 | Walker ................... | 310/156.19 |
| 7,208,854 B1 | 4/2007 | Saban et al. | |
| 7,385,332 B2 | 6/2008 | Himmelmann et al. | |
| 7,521,906 B2 | 4/2009 | Rozman et al. | |
| 7,545,067 B2 * | 6/2009 | Drexlmaier ............. | 310/156.13 |
| 7,548,006 B2 | 6/2009 | Yu | |
| 7,646,124 B2 * | 1/2010 | Himmelmann et al. . | 310/156.28 |

FOREIGN PATENT DOCUMENTS

| EP | 2 020 745 | 2/2009 |
|---|---|---|
| KR | 0144716 B1 | 10/1998 |
| KR | 1020060024509 A | 3/2006 |

* cited by examiner

*Primary Examiner* — Thanh Lam
(74) *Attorney, Agent, or Firm* — Cantor Colburn LLP

(57) ABSTRACT

A rotor (12) for an electric machine (10) includes a rotor disc (24) extending radially outwardly from a central axis (18) of the rotor (12) and a magnet retention band (30) including a plurality of magnet retention tabs (32). The magnet retention tabs (32) extend radially from the magnet retention band (30) and axially along a length of the magnet retention band (30). The magnet retention band (30) is secured to the rotor face (24) via a retention means and extends substantially axially therefrom. A plurality of permanent magnets (14), each permanent magnet (14) of the plurality of permanent magnets (14) are located at the magnet retention band (30) between adjacent magnet retention tabs (32) and are radially and circumferentially retained between the magnet retention tabs (32) and the magnet retention band (30).

20 Claims, 5 Drawing Sheets

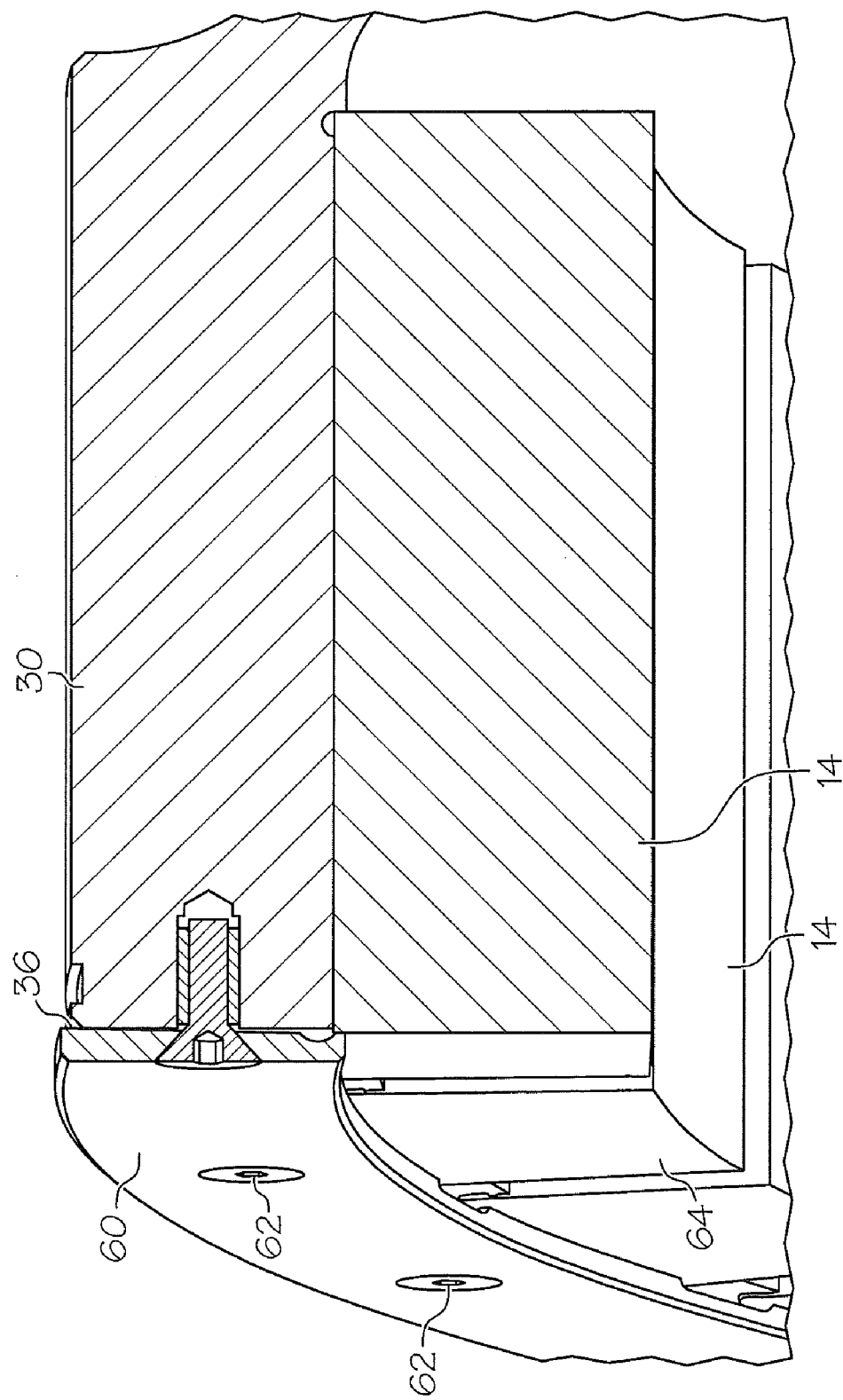

ROTOR FOR PERMANENT MAGNET ELECTRIC MACHINE

BACKGROUND OF THE INVENTION

The subject matter disclosed herein relates generally to electric machines. More specifically, the subject disclosure relates to rotor construction of permanent magnet electric machines.

Permanent magnet electric machines have two primary components, a rotating rotor which includes at least one permanent magnet and a stationary stator which includes one or more stator windings. In some electric machines, those of conventional configuration, the rotor is located inboard of the stator, so the stator surrounds the rotor. In other machines, often referred to as inside out machines, the stator is located inboard of the rotor so that the rotor surrounds the stator. The rotor includes permanent magnets which convert electromagnetic force into mechanical force. The permanent magnets are typically secured to the rotor assembly by adhesives. Attachment of the permanent magnets to the rotor via adhesives, however, subjects the magnets to high loads during operation of the electric machine leading to damage and/or failure of the permanent magnets and the electric machine.

BRIEF DESCRIPTION OF THE INVENTION

According to one aspect of the invention, a rotor for an electric machine includes a rotor disc extending radially outwardly from a central axis of the rotor and a magnet retention band including a plurality of magnet retention tabs. The magnet retention tabs extend radially from the magnet retention band and axially along a length of the magnet retention band. The magnet retention band is secured to the rotor face via a retention means and extends substantially axially therefrom. A plurality of permanent magnets, each magnet of the plurality of magnets are located at the magnet retention band between adjacent magnet retention tabs and are radially and circumferentially retained between the magnet retention tabs and the magnet retention band.

According to another aspect of the invention, an electric machine includes a stator and a rotor in electromagnetic communication with the stator. The rotor includes a rotor disc extending radially outwardly from a central axis of the rotor and a magnet retention band including a plurality of magnet retention tabs. The magnet retention tabs extend radially from the magnet retention band and axially along a length of the magnet retention band. The magnet retention band is secured to the rotor face via a retention means and extends substantially axially therefrom. A plurality of permanent magnets, each magnet of the plurality of magnets are located at the magnet retention band between adjacent magnet retention tabs and are radially and circumferentially retained between the magnet retention tabs and the magnet retention band.

According to yet another aspect of the invention, a method of assembling a rotor for an electric machine includes forming a plurality of magnet retention tabs in an annular magnet retention band, the plurality of magnet retention tabs extending substantially radially from the magnet retention band. A first axial end of the magnet retention band is secured to a rotor disc via a plurality of mechanical fasteners extending from the rotor disc into the magnet retention band. A plurality of permanent magnets are inserted into the magnet retention band and retained circumferentially between adjacent magnet support tabs and radially between the magnet support tabs and the magnet support band.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6 is another cross-sectional view of an embodiment of a rotor for an electric machine.

The detailed description explains embodiments of the invention, together with advantages and features, by way of example with reference to the drawings.

DETAILED DESCRIPTION OF THE INVENTION

Figure 1:
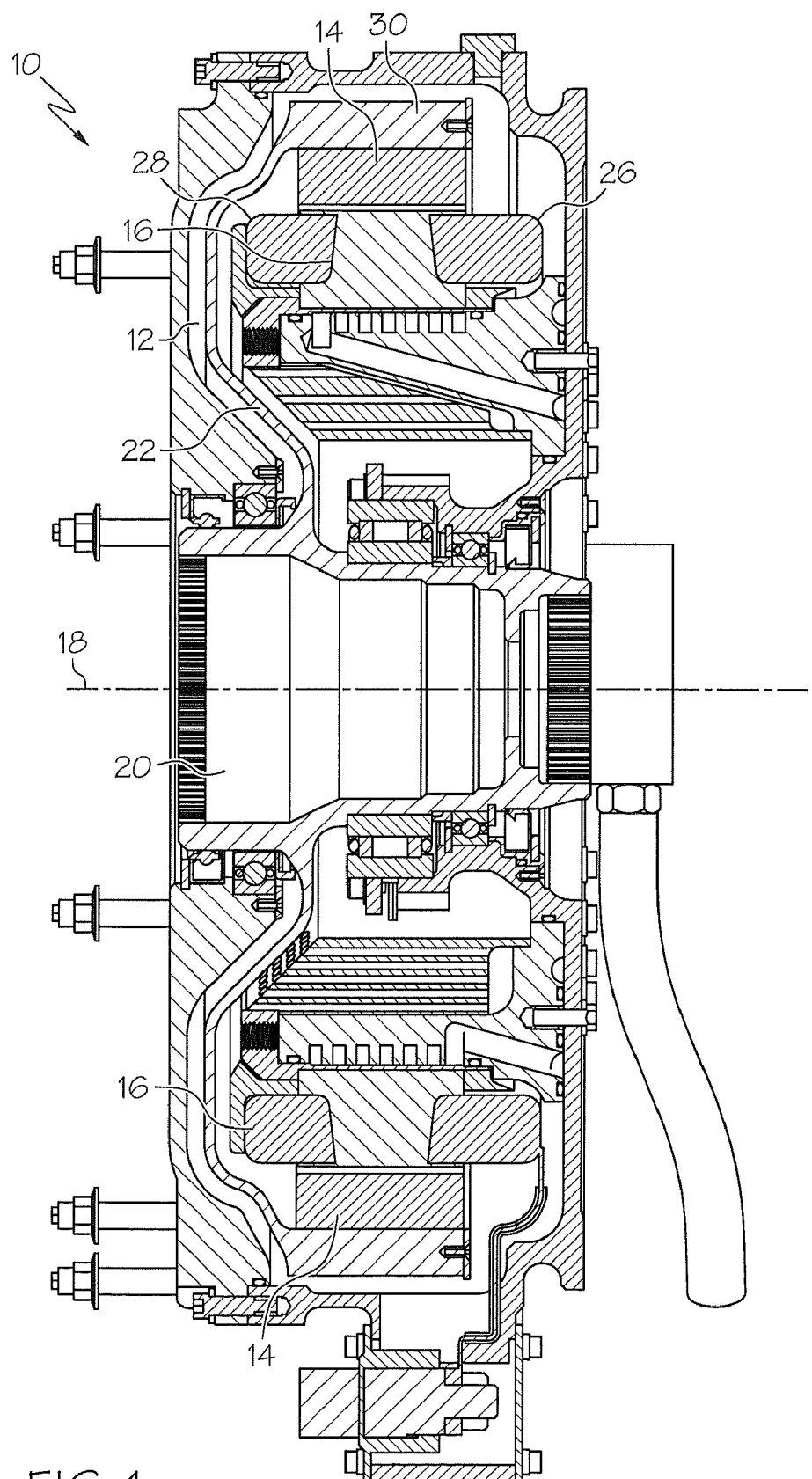
FIG. 1 is a cross-sectional view of an embodiment of an electric machine.
Figure 2:
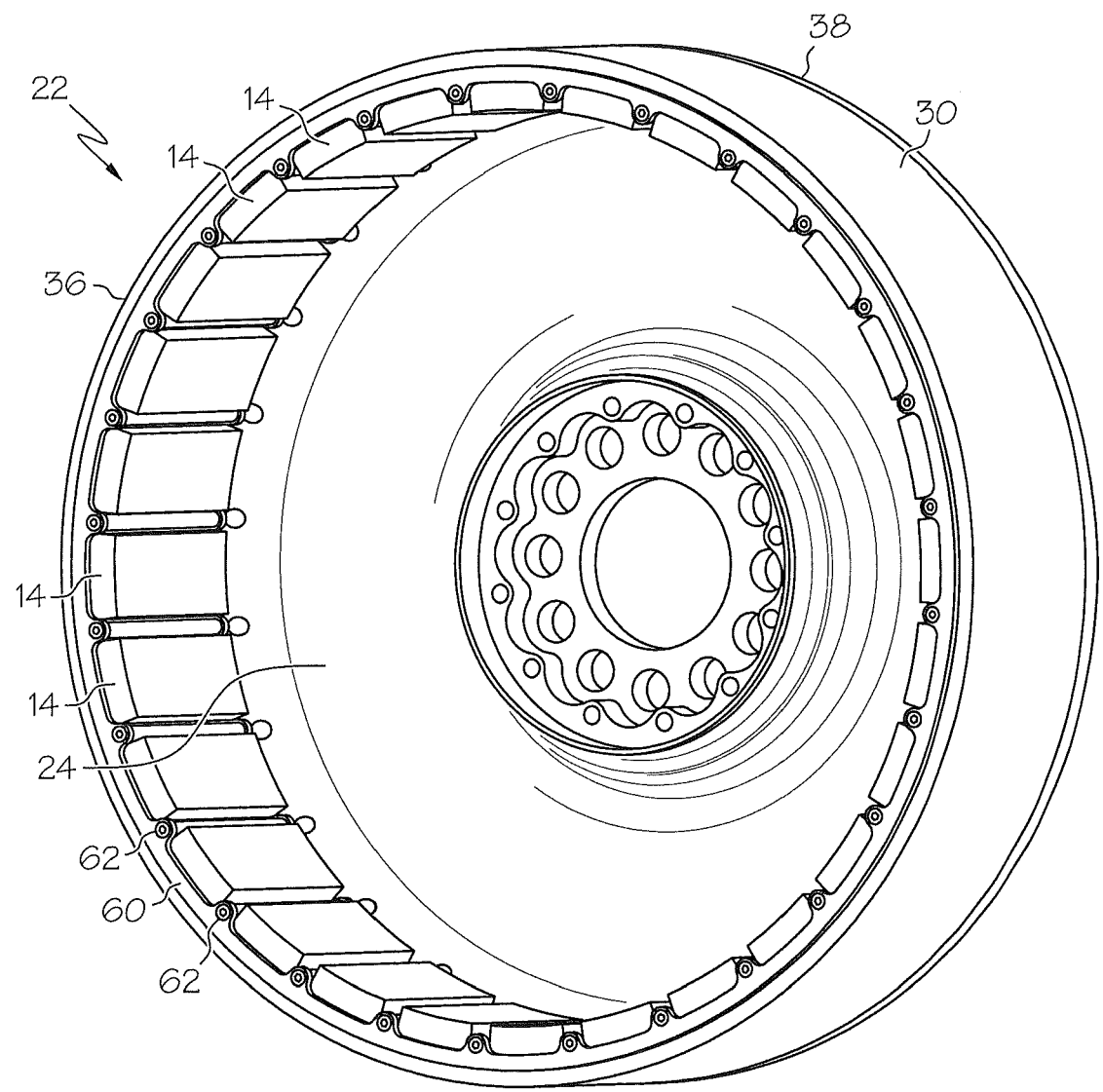
FIG. 2 is a perspective view of an embodiment of a rotor of an electric machine.

Shown in FIG. 1 is an embodiment of an electric machine 10. The electric machine 10 of FIG. 1 is of an inside out configuration including a rotor 12 having a plurality of permanent magnets 14 which are disposed radially outboard of a stator 16. The rotor 12 is rotatable about a central axis 18 of the electric machine and comprises a shaft 20 disposed at the central axis 18 which secured to a hub 22. As shown in FIG. 2, the hub 22 includes a rotor disc 24 which extends radially outwardly from the shaft 20. The rotor disc 24 is disposed either at a first end 26 or a second end 28 of the stator 16. The hub 22 further includes a magnet support band 30. The magnet support band 30 is substantially annular in shape may be concentric with the shaft 20 and the rotor disc 24. As shown in FIG. 1, the magnet support band 30 is disposed radially outboard of the stator 16. In embodiments where the electric machine 10 is of a conventional configuration, however, the magnet support band 30 may be disposed radially inboard of the stator 16.

Figure 3:
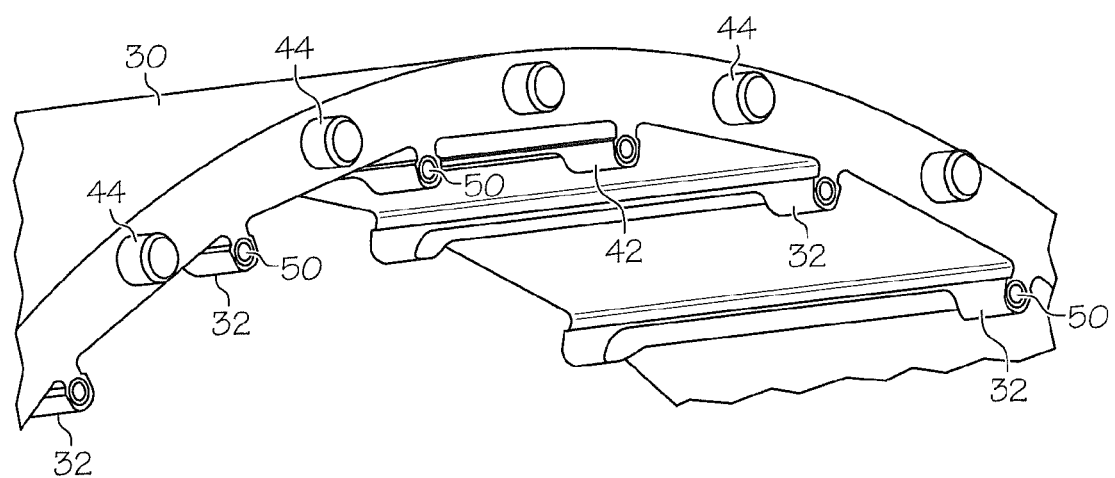
FIG. 3 is a partial perspective view of an embodiment of a magnet support band of a rotor for an electric machine.

Referring now to FIG. 3, the magnet support band 30 includes a plurality of magnet retention tabs 32 extending from an inner surface 34 of the magnet support band 30. The plurality of magnet retention tabs 32 are arrayed around the inner surface 34 and extend from a first band end 36 to a second band end 38 (shown in FIG. 2). In some embodiments, the magnet retention tabs 32 extend in a substantially axial direction, but it is to be appreciated that other directions, for example, skewed to the central axis 18 are contemplated within the present scope. The magnet retention tabs 32 are disposed and configured to retain a permanent magnet 14 of the plurality of permanent magnets 14 (shown in FIG. 2) in a desired radial and circumferential position between two adjacent magnet retention tabs 32. For example, as shown in FIG. 3, each retention tab 32 may have a substantially T-shaped cross section with a support 40 extending from the inner surface 34 and a cross portion 42. The permanent magnet 14 is inserted between adjacent supports 40 and between the inner surface 34 and the cross portion 42. The adjacent supports 40 retain the permanent magnet 14 circumferentially, while the inner surface 34 and the cross portion 42 retain the permanent magnet 14 radially. It is to be appreciated that the T-shaped retention tabs 32 are merely exemplary and that other shapes of magnet retention tabs 32, for example L-shaped or V-shaped, are contemplated within the present scope. In some embodiments, the magnet retention tabs 32 are formed integral to the magnet support band 30. Because the magnet support band 30 is a separate component of the rotor 12 from the rotor disc 24, the magnet retention tabs 32 may be efficiently formed via, for example, a through broaching process or by electrical discharge machining (EDM).

Figure 4:
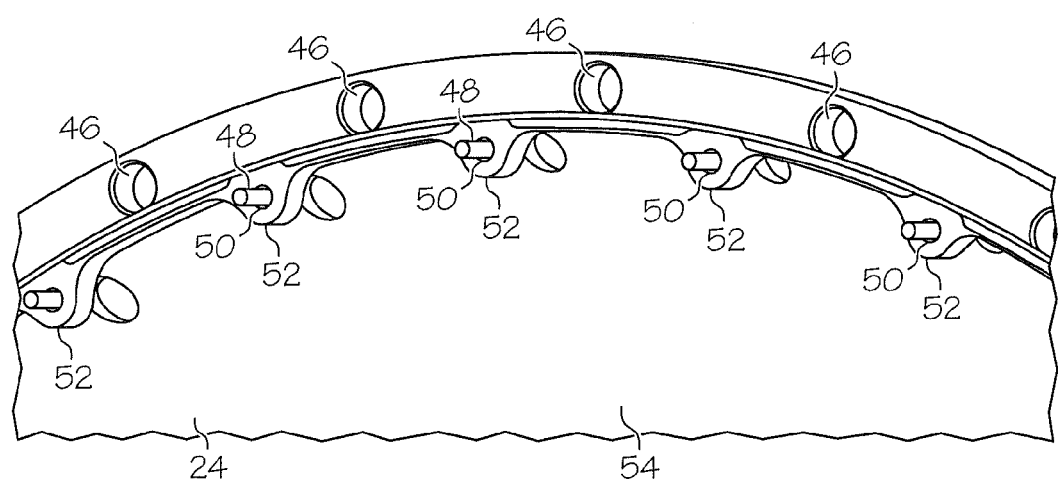
FIG. 4 is a partial perspective view of an embodiment of a rotor disc for an electric machine.

As shown in FIG. 2, the magnet support band 30 is secured to the rotor disc 24 at the second band end 38. Referring again to FIG. 3, in some embodiments, the magnet support band 30 includes a plurality of rotor drive pins 44 which extend axially from the second band end 38. The rotor drive pins 44 are insertable into complimentary rotor drive sockets 46, shown in FIG. 4, in the rotor disc 24. The rotor drive pins 44 and rotor drive sockets 46 are configured to properly locate the magnet support band 30 to the rotor disc 24 and to efficiently transfer rotational energy from the rotor disc 24 to the magnet support band 30 during operation of the electric machine 10. Alternatively, in some embodiments the rotor drive pins 44 are disposed in the rotor disc 24 while the rotor drive sockets 46 are disposed in the magnet support band 30. In some embodiments, the magnet support band 30 is secured to the rotor disc 24 axially via a plurality of rotor retention screws 48. The rotor retention screws 48 extend from the rotor disc 24 into a plurality of retention screw holes 50, as shown in FIG. 3 and 4. As shown, the retention screw holes 50 may be disposed in the supports 40 of the magnet retention tabs 32 or in other suitable locations, for example between rotor drive pins 44. Alternatively, the magnet support band 30 may be secured to the rotor disc 24 by other means, for example, by welding.

Figure 5:
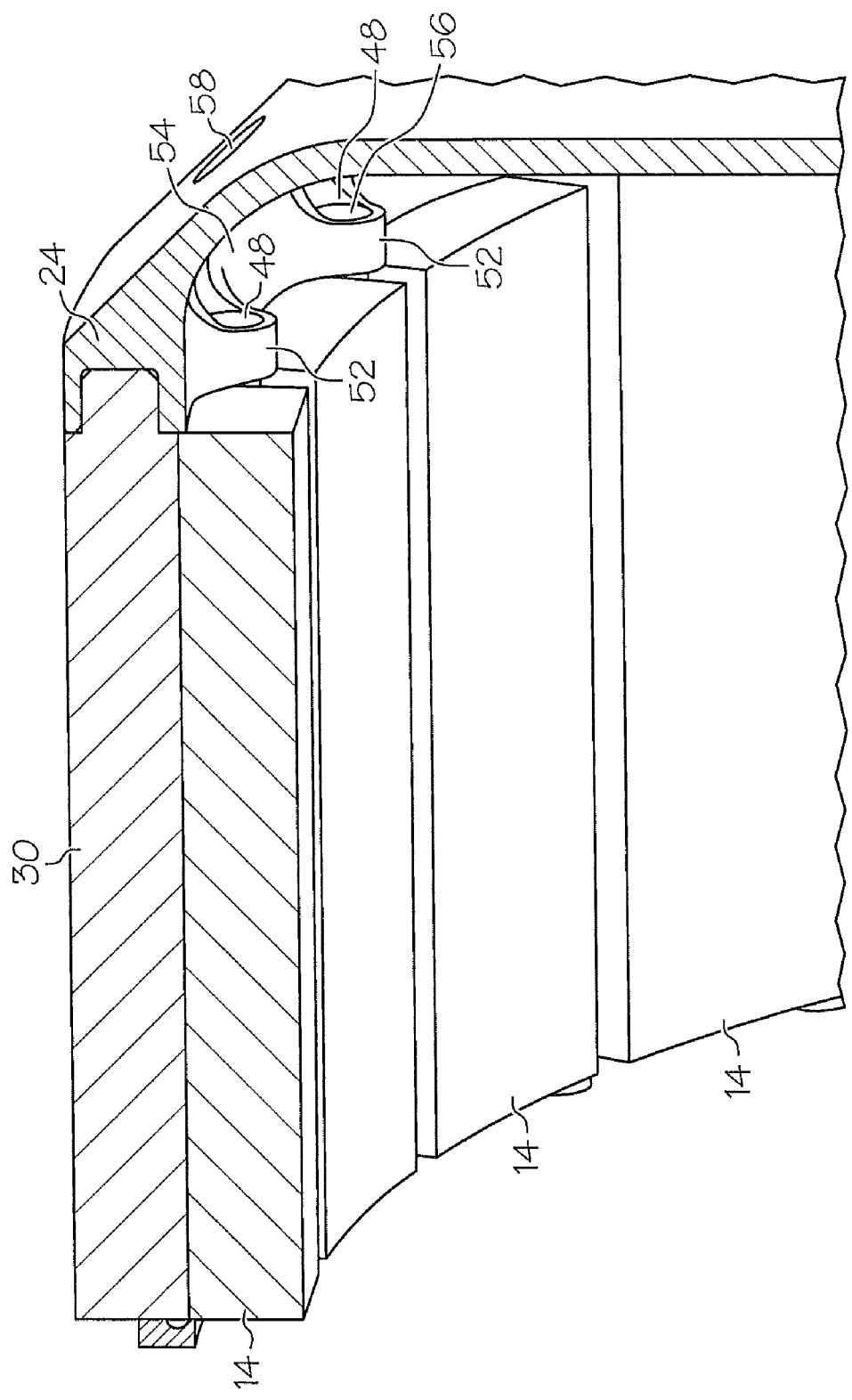
FIG. 5 is a cross-sectional view of an embodiment of a rotor for an electric machine.

In some embodiments, as shown in FIG. 5, the rotor disc 24 may include a plurality of rotor preload tabs 52 which extend radially inwardly from an inner surface 54 of the rotor disc 24. Each rotor preload tab 52 includes a preload screw hole 56 through which the retention screws 48 are inserted. As the retention screws 48 are tightened, the rotor preload tabs 52 exert a clamping force on the magnet support band 30. In some embodiments, to insert the retention screws 48 into the rotor preload tabs 52, a plurality of access holes 58 are provided through the rotor disc 24.

Referring now to FIG. 6, once the plurality of permanent magnets 14 are inserted into the magnet support band 30, they are axially retained in the rotor 12 via a retention ring 60 secured to the first band end 36. The retention ring 60 is secured to the first band end 36 by, for example, a plurality of ring screws 62 extending through the retention ring 60 into the first band end 36. The retention ring 60 extends radially inwardly at least partially across a front face 64 of each permanent magnet 14 of the plurality of permanent magnets 14 thus preventing their escape from the magnet support band 30.

Securing the plurality of permanent magnets 14 in the rotor 12 via mechanical means rather than with adhesives lowers the loads that the permanent magnets 14 are subjected to during operation of the electrical machine 10. Further, formation of the magnet support band 30 separate from the remainder of the rotor 12 allows for more efficient manufacturing methods to be utilized in formation of the plurality of supports 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor for an electric machine comprising:
   a rotor disc extending radially outwardly from a central axis of the rotor;
   a magnet retention band including a plurality of magnet retention tabs extending radially from the magnet retention band and axially along a length of the magnet retention band, the magnet retention band secured to the rotor disc and extending substantially axially therefrom;
   a plurality of permanent magnets, each permanent magnet of the plurality of permanent magnets disposed at the magnet retention band between adjacent magnet retention tabs and radially and circumferentially retained between the magnet retention tabs and the magnet retention band; and
   a retention means to secure the magnet retention band to the rotor disc.

2. The rotor of claim 1 wherein the retention means comprises a plurality of mechanical fasteners.

3. The rotor of claim 2 wherein the plurality of mechanical fasteners extend into a plurality of retention screw holes disposed in the plurality of magnet retention tabs.

4. The rotor of claim 1 comprising a plurality of rotor drive pins disposed in one of the magnet retention band or the rotor disc, the plurality of rotor drive pins insertable into a complimentary plurality of rotor drive sockets disposed in the other of the magnet retention band or the rotor disc.

5. The rotor of claim 4 wherein the retention means comprises welding the magnet retention band to the rotor disc.

6. The rotor of claim 1 wherein each magnet retention tab of the plurality of magnet retention tabs is substantially T-shaped.

7. The rotor of claim 6 wherein each permanent magnet of the plurality of permanent magnets is retained radially by a cross portion of at least one magnet retention tab of the plurality of magnet retention tabs.

8. The rotor of claim 1 wherein the plurality of magnet retention tabs are formed by one of broaching or electrical discharge machining (EDM).

9. The rotor of claim 1 comprising a retention ring secured to a first end of the magnet retention band opposite a second end at which the rotor disc is secured to retain the plurality of permanent magnets in the magnet support band axially between the rotor disc and the retention ring.

10. The rotor of claim 9 wherein the retention ring extends radially across a face of each permanent magnet of the plurality of permanent magnets to prevent axial movement of the plurality of permanent magnets.

11. The rotor of claim 9 wherein the retention ring is secured to the magnet retention band by a plurality of ring screws.

12. The rotor of claim 1 wherein the plurality of permanent magnets are disposed at a radially inboard surface of the magnet retention band.

13. An electric machine comprising:
    a stator; and a rotor in electromagnetic communication with the stator comprising:
a rotor disc extending radially outwardly from a central axis of the rotor;
a magnet retention band including a plurality of magnet retention tabs extending radially from the magnet retention band and axially along a length of the magnet retention band, the magnet retention band secured to the rotor disc and extending substantially axially therefrom;
a plurality of permanent magnets, each permanent magnet of the plurality of permanent magnets disposed at the magnet retention band between adjacent magnet retention tabs and radially and circumferentially retained between the magnet retention tabs and the magnet retention band; and
a plurality of mechanical fasteners to secure the magnet retention band to the rotor disc.

14. The electric machine of claim 13 wherein the plurality of mechanical fasteners extend into a plurality of retention screw holes disposed in the plurality of magnet retention tabs.

15. The electric machine of claim 13 wherein the plurality of mechanical fasteners extend through a plurality of preload tabs in the rotor disc into the magnet retention band.

16. The electric machine of claim 13 wherein each magnet retention tab of the plurality of magnet retention tabs is substantially T-shaped.

17. The electric machine of claim 16 wherein each permanent magnet of the plurality of permanent magnets is retained radially by a cross portion of at least one magnet retention tab of the plurality of magnet retention tabs.

18. The electric machine of claim 13 wherein the plurality of permanent magnets are disposed at a radially outboard of the stator.

19. A method of assembling a rotor for an electric machine comprising:
forming a plurality of magnet retention tabs in an annular magnet retention band, the plurality of magnet retention tabs extending substantially radially from the magnet retention band;
securing a first axial end of the magnet retention band to a rotor disc via a plurality of mechanical fasteners extending from the rotor disc into the magnet retention band;
inserting a plurality of permanent magnets into the magnet retention band; and
retaining each permanent magnet of the plurality of permanent magnets circumferentially between adjacent magnet support tabs and radially between the magnet support tabs and the magnet support band.

20. The method of claim 19 comprising securing a retention ring to a second end of the magnet support band thereby retaining the plurality of permanent magnets axially between the rotor disc and the retention ring.

* * * * *